United States Patent
Berkmann

[11] Patent Number: 5,799,963
[45] Date of Patent: Sep. 1, 1998

[54] TELESCOPIC FRONT WHEEL SUSPENSION FOR A MOTORCYCLE

[75] Inventor: Franz Berkmann, Munich, Germany

[73] Assignee: Bayerische Motoren Werke Aktiengesellschaft, Munich, Germany

[21] Appl. No.: 613,694

[22] Filed: Mar. 11, 1996

[30] Foreign Application Priority Data

Mar. 9, 1995 [DE] Germany .................. 195 08 499.3

[51] Int. Cl.⁶ .................................................. B62K 25/08
[52] U.S. Cl. ............................................ 280/276; 180/219
[58] Field of Search .................................. 280/276, 277, 280/280, 279, 286; 180/219, 227

[56] References Cited

U.S. PATENT DOCUMENTS

| 4,738,468 | 4/1988 | Baron | 280/276 |
| 5,069,467 | 12/1991 | Claudio | 280/276 |
| 5,599,034 | 2/1997 | Brigden | 280/276 |

FOREIGN PATENT DOCUMENTS

| 35 13 974 | 9/1986 | Germany . | |
| 94 04 873.8 | 6/1994 | Germany . | |
| 0021494 | 10/1914 | United Kingdom | 280/276 |

*Primary Examiner*—Anne Marie Boehler
*Attorney, Agent, or Firm*—Evenson, McKeown, Edwards & Lenahan, P.L.L.C.

[57] ABSTRACT

A telescopic front wheel suspension for a motorcycle has an unsprung part which by way of a ball joint rotatable about a virtual steering axis is connected by a four bar mechanism with a part of the motorcycle which is fixed to the frame. The four bar mechanism consists of two control bars which, swivellably by way of swivel pins fixed to the frame, are connected by a coupler. The coupler supports the unsprung part of the telescopic front wheel suspension. The four bar mechanism is designed such that its swivel pins fixed to the frame, when viewed in the direction of the longitudinal axis of the motorcycle, are situated in front of additional swivel pins of the coupler which swivellably connect the coupler with the control bars.

5 Claims, 1 Drawing Sheet

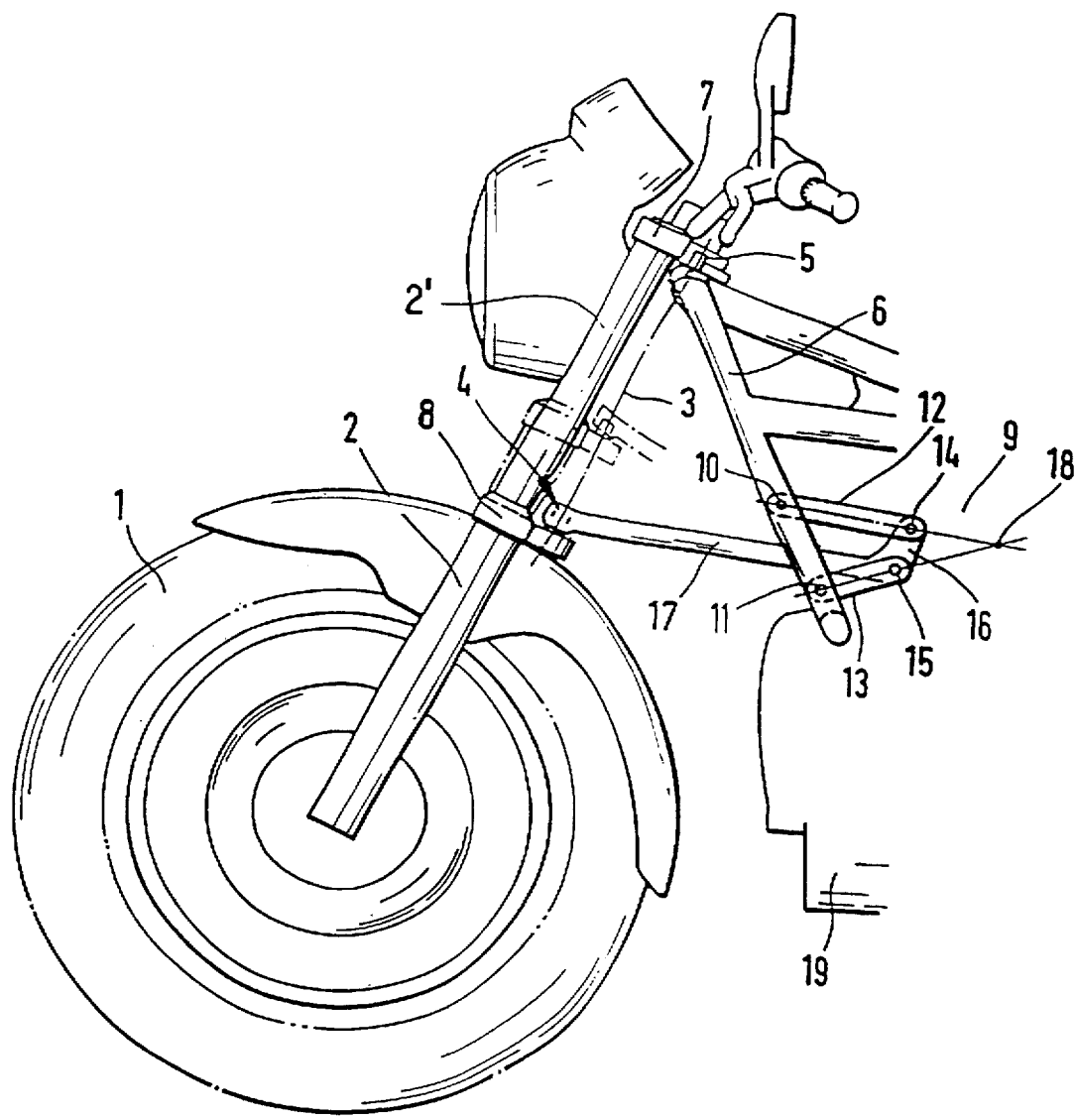

TELESCOPIC FRONT WHEEL SUSPENSION FOR A MOTORCYCLE

BACKGROUND AND SUMMARY OF THE INVENTION

This invention relates to a telescopic front wheel suspension for a motorcycle and, more particularly, to a telescopic front wheel suspension having an unsprung part which, by way of a universal joint such as a ball joint, is connected rotatably about a virtual steering axis with a part of the motorcycle fixed to the frame by a four bar mechanism. By way of two swivel pins of the four bar mechanism which are fixed to the frame, two control bars are swivellably connected which, with their other ends, by way of additional swivel pins, are swivellably connected with a coupler of the four bar mechanism. On this coupler, in turn, the unsprung part of the telescopic front wheel suspension is mounted by way of the universal joint.

It is known to connect the unsprung part of a telescopic front wheel suspension of a motorcycle by way of a four-bar mechanism with parts of the motorcycle which are fixed to the frame. German Patent document DE 35 13 974 C1 describes such a front wheel suspension for a motorcycle whose sprung part is pivotally connected rotatably about a virtual steering axis by way of a universal joint, preferably a ball joint, to a part of the motorcycle fixed to the frame. The unsprung part of the telescopic front wheel suspension is also rotatably connected by way of a universal joint about the virtual steering axis by a four-bar mechanism to a part of the motorcycle fixed to the frame. The four-bar mechanism has two swivel pins fixed to the frame by which two control bars are swivellably connected. With their other ends, these control bars are swivellably connected by way of swivel pins with a coupler of the four-bar mechanism. The unsprung part of the telescopic fork is mounted on this coupler by way of the universal joint. The connection of both universal joints results in the virtual steering axis about which the front wheel suspension can be rotated.

Such a front wheel suspension for a motorcycle has a diminishing anti-dive control above the compression path and a sluggish response behavior of the suspension.

There is therefore needed a design of the four-bar mechanism of the telescopic front wheel suspension such that the front wheel suspension responds sensitively to uneven ground conditions and, in the process, the anti-dive control above the spring travel takes place progressively.

According to the present invention, these needs are met by a telescopic front wheel suspension having an unsprung part which, by way of a universal joint such as a ball joint, is connected rotatably about a virtual steering axis with a part of the motorcycle fixed to the frame by a four bar mechanism. By way of two swivel pins of the four bar mechanism which are fixed to the frame, two control bars are swivellably connected which, with their other ends, by way of additional swivel pins, are swivellably connected with a coupler of the four bar mechanism. On this coupler, in turn, the unsprung part of the telescopic front wheel suspension is mounted by way of the universal joint. The two swivel pins, of the four bar mechanism which are fixed to the frame, viewed in the direction of the longitudinal axis of the motorcycle, are situated in front of the additional swivel pins of the coupler.

According to the present invention, the four-bar mechanism is designed such that its swivel pins fixed to the frame—when viewed in the direction of the longitudinal axis of the motorcycle—are situated in front of the additional swivel pins of the coupler.

In preferred embodiments of the invention, the longitudinal axes of the control bars of the four-bar mechanism, which are pivotally connected to the parts fixed to the frame, intersect in their lengthening. Alternatively, they are situated in parallel. If the longitudinal axes of the control bars have an intersecting point, then the control bars must be arranged such that the intersecting point is situated behind the swivel pins of the coupler.

Such a design of the four-bar mechanism of a telescopic front wheel suspension has the advantage that, mainly in the rebound condition, the compression differential angles are small. The compression direction and the rebound direction essentially correspond to one another. This results in a good response behavior of the suspension because the force component is relatively large in the path direction. Furthermore, as a result of a four-bar mechanism designed in this manner, an anti-dive control is achieved which essentially advantageously assumes values of 0% in the normal position to approximately 70% in the compressed position. The reason is that the roll center path of the four-bar mechanism is situated behind the coupler joints and rises during the compression movement. As a result, the overall roll center for the front wheel will also rise during the compression movement.

By means of the thus designed four bar mechanism, an anti-dive control is obtained which rises or is constant progressively along the compression path while the spring rate acting on the front wheel is largely independent of the load which, in turn, permits an optimal damper coordination. Advantageously, by means of this arrangement, any type of wheel elevation curve or course of the anti-dive control is also possible.

Other objects, advantages and novel features of the present invention will become apparent from the following detailed description of the invention when considered in conjunction with the accompanying drawings.

BRIEF DESCRIPTION OF THE DRAWING

The single figure is a lateral view of a telescopic front wheel suspension for a motorcycle according to the present invention.

DETAILED DESCRIPTION OF THE DRAWING

A front wheel 1 of a motorcycle is guided in a telescopic fork (only one side of which is shown) having an unsprung part 2 and a sprung part 2'. The telescopic fork 2 is connected by means of two ball joints 4, 5 with the motorcycle frame 6 so as to be rotatable about a virtual steering axis 3 indicated by a dash-dotted line. The upper ball joint 5 directly connects an upper fork bridge 7 with the motorcycle frame 6, while the lower ball joint 4 connects a lower fork bridge 8, by way of a four bar mechanism 9, with the motorcycle frame 6. The four bar mechanism 9 consists of two control bars 12, 13 which are swivellably connected directly to the motorcycle frame 6 by means of swivel pins 10, 11 which are fixed to the frame. The control bars 12, 13 are rotating shafts which, in turn, are connected with one another on their free ends by way of additional swivel pins 14, 15 through the use of a coupler 16. The coupler 16 is constructed as an angle lever whose long leg 17 is connected at its other end to the lower fork bridge 8 by way of the ball joint 4.

According to the invention, the four bar mechanism 9 is designed such that the swivel pins 10, 11 of the four bar mechanism 9 fixed to the frame—when viewed in the direction of the longitudinal axis of the motorcycle—are situated in front of the other swivel pins 14, 15 of the coupler 16. The length of the control bars 12, 13 are dimensioned such that an extended longitudinal axes through the control bars 12, 13 intersect. The virtual intersection point 18, when viewed in the direction of the longitudinal axis of the motorcycle, is situated behind the other swivel pins 14, 15 of the coupler 16.

It is self-evident with respect to such a front wheel suspension that the four bar mechanism 9 is designed such that, in the position shown, for straight-ahead driving, during a compression movement (indicated by an interrupted line), a movement of the control bars 12, 13 and the coupler 16 of the four bar mechanism 9 is possible only in the drawing plane. Because of the design of the joints, there is no degree of freedom for the four bar mechanism 9 out of or into the drawing plane. Likewise, it is self-evident that the swivel pins 10, 11 fixed to the frame may not only be mounted on the motorcycle frame 6, but also on other parts of the motorcycle fixed to the frame, such as a motor 19.

Although the invention has been described and illustrated in detail, it is to be clearly understood that the same is by way of illustration and example, and is now to be taken by way of limitation. The spirit and scope of the present invention are to be limited only by the terms of the appended claims.

What is claimed is:

1. A motorcycle, comprising a frame and a telescopic front wheel suspension having an unsprung part, said unsprung part being connected by way of a universal joint so as to be rotatable about a virtual steering axis;

a four bar mechanism connecting the unsprung part with one of a frame fixed part of the motorcycle and the frame;

wherein the four bar mechanism includes two swivel pins fixed to the one of the frame fixed part and the frame, two control bars each of which is swivellably connected with one of said two swivel pins, and additional swivel pins for swivellably connecting said two control bars at their other ends with a coupler of the four bar mechanism;

wherein the unsprung part of the telescopic front wheel suspension is mounted via the universal joint on the coupler; and wherein the two swivel pins of the four bar mechanism are situated in front of the additional swivel pins of the coupler viewed in a direction of a longitudinal axis through the motorcycle.

2. The motorcycle according to claim 1, wherein said universal joint is a ball joint.

3. The motorcycle according to claim 1, wherein longitudinal axes extending through said control bars intersect at an intersection point, said intersection point being located behind the additional swivel pins of the coupler viewed in the direction of the longitudinal axis of the motorcycle.

4. The motorcycle according to claim 1, wherein longitudinal axes extending through said control bars do not intersect.

5. A motorcycle, comprising:

a frame;

a front wheel suspension having an unsprung part;

a four bar mechanism coupling the unsprung part with one of the frame and a frame fixed part; said four bar mechanism including:

two swivel pins arranged fixed to the one of the frame and the frame fixed part;

first and second control bars, each of said first and second control bars being swivellably connected with one of said two swivel pins at one end thereof;

a coupler having additional swivel pins, each of the first and second control bars being swivellably connected at their other end with the coupler via a respective one of said additional swivel pins;

wherein said two swivel pins are arranged in front of the additional swivel pins of the coupler viewed in a direction of a longitudinal axis of the motorcycle from a front end to a rear end of the motorcycle.

* * * * *